United States Patent
Ho

(10) Patent No.: US 9,628,598 B2
(45) Date of Patent: Apr. 18, 2017

(54) METHOD FOR OPERATING APPLICATION AND ELECTRONIC DEVICE THEREOF

(71) Applicant: Samsung Electronics Co., Ltd., Gyeonggi-do (KR)

(72) Inventor: Ji-Young Ho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 142 days.

(21) Appl. No.: 14/230,594

(22) Filed: Mar. 31, 2014

(65) Prior Publication Data

US 2015/0026598 A1  Jan. 22, 2015

(30) Foreign Application Priority Data

Jul. 17, 2013 (KR) ........................ 10-2013-0083949

(51) Int. Cl.
G06F 3/00 (2006.01)
H04M 1/2745 (2006.01)
H04M 1/725 (2006.01)

(52) U.S. Cl.
CPC .. *H04M 1/27455* (2013.01); *H04M 1/274508* (2013.01); *H04M 1/72547* (2013.01)

(58) Field of Classification Search
CPC ........................ G06F 3/0484; H04M 1/274508
See application file for complete search history.

(56) References Cited

U.S. PATENT DOCUMENTS

| | | | | |
|---|---|---|---|---|
| 8,831,567 | B2 * | 9/2014 | Kim .................... | G06F 21/6218 455/411 |
| 8,832,567 | B1 * | 9/2014 | Jing ....................... | G06F 3/0486 715/738 |
| 2009/0249418 | A1 * | 10/2009 | Alastruey Gracia ............... | H04N 7/17318 725/114 |
| 2011/0030067 | A1 * | 2/2011 | Wilson ................ | G06F 21/6245 726/27 |
| 2011/0154209 | A1 * | 6/2011 | Fan .................... | G06F 17/30867 715/736 |
| 2011/0302504 | A1 * | 12/2011 | Khare ..................... | H04L 51/32 715/751 |
| 2011/0307354 | A1 * | 12/2011 | Erman ....................... | G06F 8/60 705/27.1 |
| 2014/0090091 | A1 * | 3/2014 | Prakash .............. | G06F 21/6245 726/30 |
| 2014/0337041 | A1 * | 11/2014 | Madden ................ | G06F 19/322 705/2 |

FOREIGN PATENT DOCUMENTS

KR     20110099599     9/2011

* cited by examiner

*Primary Examiner* — Omar Abdul-Ali
(74) *Attorney, Agent, or Firm* — The Farrell Law Firm, P.C.

(57) ABSTRACT

A method is provided for sharing user information in an electronic device. User information is determined. A sharable item is displayed for the determined user information. A setting is provided for the sharable item indicating whether to restrict sharing for the sharable item. It is determined whether to share the user information based on the setting for the sharable item.

19 Claims, 15 Drawing Sheets

METHOD FOR OPERATING APPLICATION AND ELECTRONIC DEVICE THEREOF

PRIORITY

This application claims priority under 35 U.S.C. §119(a) to a Korean Patent Application filed in the Korean Intellectual Property Office on Jul. 17, 2013 and assigned Serial No. 10-2013-0083949, the entire disclosure of which is incorporated herein by reference.

BACKGROUND OF THE INVENTION

1. Field of the Invention

The present invention relates generally to a method for operating an application of an electronic device, and more particularly, to a method for sharing information in the electronic device.

2. Description of the Related Art

As the electronic industry and communication technology develops, new services based on data, voice, and video are rapidly being developed. The development of micro electronic, computer software, and computer hardware technologies has become foundational in processing increasingly complicated operations of electronic devices, electronic device provides even a range that resolves a network limitation, so that stronger functionality may be achieved gradually. The demand for electronic devices, particularly mobile terminals, such as smart phones, is urgent for users preferring electronic devices with greater functionality and flexibility. With the development of communication technology, electronic devices have evolved into multimedia devices which provide not only voice communication services, but also various multimedia services using data communication services. Electronic devices provide various applications in order to provide various multimedia services. A Social Network Service (SNS) application is an example of a user-based application which is widely used and enables a user to communicate with a counterpart electronic device and share data.

SUMMARY OF THE INVENTION

The invention has been made to address at least the above problems and/or disadvantages and to provide at least the advantages described below. Accordingly, an aspect of the present invention provides a method for operating an application and an electronic device thereof.

Another aspect of the present invention provides a method for operating an application, capable of preventing personal information leakage, and an electronic device thereof.

Still another aspect of the present invention provides a user interface that may be operated intuitively.

In accordance with an aspect of the present invention, a method is provided for sharing user information in an electronic device. User information is determined. A sharable item is displayed for the determined user information. A setting is provided for the sharable item indicating whether to restrict sharing for the sharable item. It is determined whether to share the user information based on the setting for the sharable item.

In accordance with another aspect of the present invention, an electronic device is provided that includes a touch-screen and at least one processor coupled with the touch-screen. The processor controls to determine user information, display a sharable item for the determined user information, provide a setting indicating whether to restrict sharing for the sharable item, and determine whether to share the user information based on the setting of the shareable item.

In accordance with another aspect of the present invention, a method for sharing information in an electronic device is provided. Contact information is determined. A sharable item for the determined contact information is displayed on a contact information input screen. A setting is provided indicating whether to restrict sharing of the sharable item. The user information is stored with the corresponding setting for the sharable item. It is determined whether to share the stored user information based on the setting of the sharable item.

BRIEF DESCRIPTION OF THE DRAWINGS

The above and other aspects, features and advantages of certain embodiments of the present invention will be more apparent from the following description taken in conjunction with the accompanying drawings in which.

DETAILED DESCRIPTION OF EMBODIMENTS OF THE PRESENT INVENTION

Figure 1:
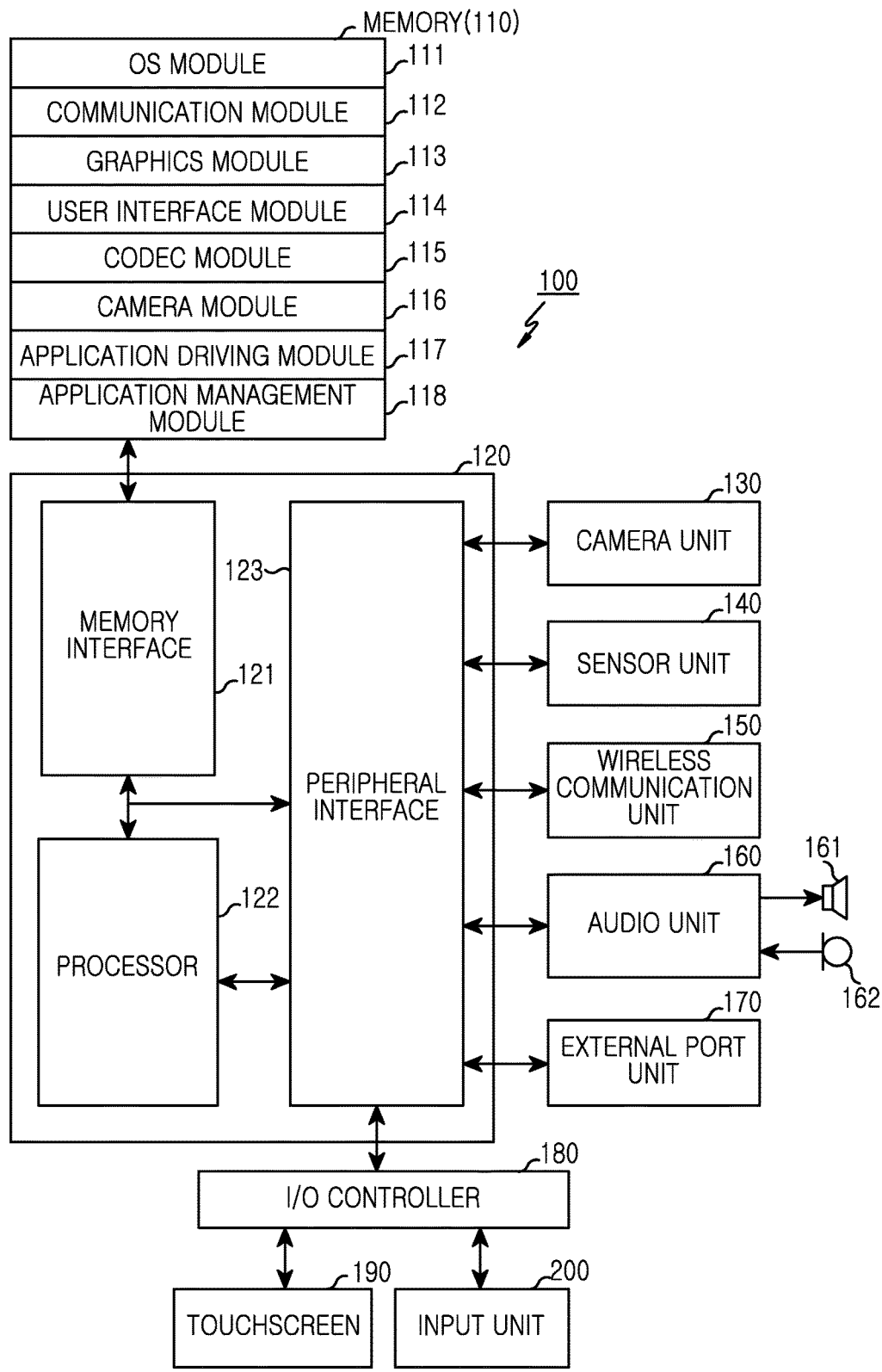
FIG. 1 is a block diagram illustrating an electronic device according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in the following description and claims are not limited to the dictionary meanings, but, are merely used by the inventor to enable a clear and consistent understanding of the invention. Accordingly, it should be apparent to those skilled in the art that the following description of the various embodiments of the present invention are provided for illustration purpose only and not for the purpose of limiting the invention as defined by the appended claims and their equivalents.

Hereinafter, a method for operating an application and an electronic device thereof according to various embodiments of the present invention are described.

In describing various embodiments of the present invention, though an electronic device to which a touchscreen may be applied as a display unit is illustrated and described, it is not limited thereto. For example, the present invention is applicable to various devices which include a touchscreen, devices such as Personal Digital Assistants (PDAs), laptop computers, mobile phones, smart phones, netbooks, Mobile Internet Devices (MID), Ultra Mobile Personal Computers (UMPCs), tablet PCs, navigation devices, MP3 players, etc.

The description below refers to the following types of applications: phonebook, games, short message service, (SMS) multimedia message service, (MMS) browser, e-mail, instant message, phone, MP3 player, schedule manage, camera, word processing, keyboard emulation, address book, contact list, widgets, Digital Right Management (DRM), voice recognition, voice duplication, position determining function, position based service, etc.

FIG. 1 is a block diagram illustrating an electronic device according to an embodiment of the present invention.

Referring to FIG. 1, the electronic device 100 may be a device such as a mobile phone, a media player, a tablet computer, a handheld computer, or a PDA. The electronic device 100 may combine two or more functions among these devices.

The electronic device 100 includes a memory 110, a processor unit 120, a camera unit 130, a sensor unit 140, a wireless communication unit 150, an audio unit 160, an external port unit 170, an Input/Output (I/O) controller 180, a touchscreen 190, and an input unit 200. A plurality of memories 110 and external port units 170 may be provided. Each element is described below.

The processor unit 120 includes a memory interface 121, at least one processor 122, and a peripheral interface 123. The memory interface 121, the at least one processor 122, and the peripheral interface 123 are integrated in at least one integrated circuit or implemented as separate elements.

The memory interface 121 controls memory access of elements such as the processor 122 and the peripheral interface 123.

The peripheral interface 123 controls connection between an I/O peripheral of the electronic device 100 and the processor 122 and the memory interface 121.

The processor 122 controls the electronic device 100 to provide various multimedia services using at least one software program. The processor 122 executes at least one program stored in the memory 110 to provide a service corresponding to the relevant program.

The processor 122 executes various software programs to perform various functions for the electronic device 100, and performs processes and controls for voice communication, video communication, and data communication.

The processor 122 performs methods of various embodiments of the present invention in cooperation with software modules stored in the memory 110. According to the present invention, the processor 122 controls to determine at least one user information, displays at least one sharable item for the determined user information, sets whether to restrict sharing of the displayed sharable item, and shares user information reflecting the set sharing restriction.

The processor 122 includes one or more data processors, image processors, or CODECs. Furthermore, the electronic device 100 may configure a data processor, an image processor, or a CODEC, separately.

The camera unit 130 performs a camera function such as a photo and video clip recording, etc. The camera unit 130 includes a Charged Coupled Device (CCD), or a Complementary Metal Oxide Semiconductor (CMOS), etc. Also, the camera unit 130 may change hardware configuration, for example, lens movement, a number of an aperture, etc. depending on a camera program executed by the processor 122.

Various elements of the electronic device 100 may be connected via one or more communication buses or an electric connection means.

The sensor unit 140 may include a motion sensor, a Hall sensor, an illuminance sensor, an image sensor, a variable resistance sensor, etc. The motion sensor detects movement of the electronic device 100, and the illuminance sensor detects ambient light. The electronic device 100 may include various sensors besides the above-mentioned sensors.

The wireless communication unit 150 enables wireless communication, and may include a Radio Frequency (RF) transmitter/receiver or a light (for example, an infrared) transmitter/receiver. The wireless communication unit 150 may be designed to operate via one or more of a GSM network, an EDGE network, a CDMA network, a W-CDMA network, an LTE network, an OFDMA network, a Wi-Fi network, a WiMax network, or a Bluetooth network depending on a communication network.

The audio unit 160 may be connected to a speaker 161 and a microphone 162 to support communication functions. Such as, voice recognition, voice duplication, digital recording, or audio input/output. The audio unit 160 provides an audio interface between a user and the electronic device 100, and receives a data signal from the processor unit 120, converts the received data signal to an electric signal, and outputs the converted electric signal via the speaker 161.

The speaker 161 converts an electric signal to an audible frequency band and output the same, and may be disposed in the front side or the rear side of the electronic device 100. The speaker 161 includes a flexible film speaker where at least one piezoelectric body has been attached on one vibration film.

The microphone 162 converts a sound wave transferred from a person or other sound sources to an electric signal. Also, the audio unit 160 receives an electric signal from the microphone 162, converts the received electric signal to an audio data signal, and transmits the converted audio data signal to the processor unit 120. The audio unit 160 may include an earphone, an ear set, a headphone, or a head set detachable from the electronic device 100.

The external port unit 170 directly connects the electronic device 100 to a counterpart electronic device, or indirectly connects the electronic device 100 to a counterpart electronic device via a network (for example, the Internet, an Intranet, a wireless LAN, etc.)

The I/O controller 180 provides an interface between an I/O unit such as the touchscreen 190, and the input unit 200, and the peripheral interface 123.

The touchscreen 190 provides an I/O interface between the electronic device 100 and a user. For example, the touchscreen 190 may apply a touch detect technology, transfer a user's touch input to the processor unit 120, and show visual information, text, graphics, or video, etc. provided from the processor unit 120 to the user.

The touchscreen 190 displays state information of the electronic device 100, a character input by the user, a moving picture, a still picture, etc. The touchscreen 190 may display information of an application driven by the processor 122.

The touchscreen 190 may further apply an arbitrary multi-touch detect technology including not only capacitive, resistive, infrared, and surface acoustic wave technologies but also other proximity sensor arrangements or other elements. The touchscreen 190 may apply at least one of a Liquid Crystal Display (LCD), an Organic Light Emitting Diode (OLED), an Active Matrix Organic Light Emitting Diode (AMOLED), a flexible display, and a 3 dimensional display.

The input unit 200 provides input data generated by the user's selection to the processor 122 via the I/O controller 180. The input unit 200 may include a keypad including at least one hardware button, a touch pad for detecting touch information, etc. The input unit 200 may include an up/down button for volume control. The input unit 200 may also include at least one of a push button, a locker button, a locker switch, a thumb-wheel, a dial, a stick, and a pointer device such as a stylus, etc. to which a relevant function has been given.

The memory 110 includes a high speed random access memory such as one or more magnetic disk storages or a non-volatile memory, one or more optical storages or a flash memory (for example, NADN, NOR). The memory 110 stores a software. The software may include an Operating System (OS) module 111, a communication module 112, a graphics module 113, a user interface module 114, a CODEC module 115, a camera module 116, an application driving module 117, and an application management module 118. The application driving module 117 and the application management module 118 may be configured in one module. A terminology of a module may be expressed as a set of instructions, an instruction set, or a program.

The OS module 111 may include WINDOWS, LINUX, Darwin, RTXC, UNIX, OS X, or a built-in OS such as VxWorks, and may include various software elements for controlling general system operations. The control of the general system operation may include memory control and management, storage hardware (device) control and management, power control and management, etc. The OS module 111 may also perform a function for swift communication between various hardwares (devices) and softwares (modules).

The communication module 112 enables communication with a counterpart electronic device such as a computer, a server, an electronic device, etc. via the wireless communication unit 150 or the external port unit 170. The communication module 112 communicates with a counterpart electronic device and control to share at least a portion of sharable items of the electronic device 100.

The graphics module 113 includes various software elements for providing and displaying graphics on the touchscreen 190. The "graphics" may refer to text, a web page, an icon, a digital image, a video, an animation, etc.

The user interface module 114 includes various software elements related to a user interface. The user interface module 114 controls to display information of an application driven by the processor 122 on the touchscreen 190. Also, the user interface module 114 includes content regarding how a state of the user interface changes or under what condition the state of the user interface changes.

The CODEC module 115 includes a software element related to encoding and decoding of a video file.

The camera module 116 includes a camera-related software element enabling camera-related processes and functions.

The application driving module 117 includes a software element for at least one application installed in the electronic device 100. The applications may include a browser, an e-mail, a phonebook, games, a short message service, a multimedia message service, an SNS, an instant message, phone, an MP3 player, a schedule management, a camera, word processing, keyboard emulation, an address book, a contact list, a widget, Digital Right Management (DRM), voice recognition, voice duplication, a position determining function, or a position based service.

The application management module 118 includes at least one software element for managing an item sharable with a counterpart electronic device with at least one application executed. The application management module 118 may include various routines for a related process and application operation support to allow a user to set sharable information for an item sharable with the counterpart electronic device. Also, when receiving a user information transmission request from the counterpart electronic device, the application management module 118 may control not to transmit user information.

Additionally, various functions of the electronic device 100 according to an embodiment of the present invention may include hardware or software including one or more processors or an Application Specific Integrated Circuit (ASIC).

Figure 2:
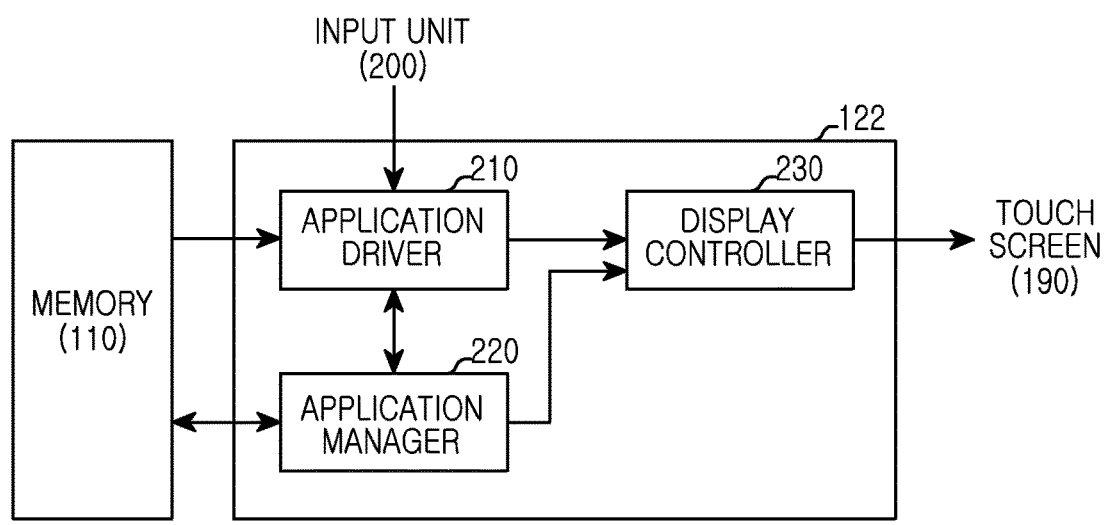
FIG. 2 is a block diagram illustrating a processor according to an embodiment of the present invention.

FIG. 2 is a block diagram illustrating the processor 122 according to an embodiment of the present invention.

Referring to FIG. 2, the processor 122 includes an application driver 210, an application manager 220, and a display controller 230. Elements of the processor 122 are formed of separate modules, but according to another embodiment, the elements of the processor 122 may be included as elements of software inside one module.

The application driver 210 executes the application driving module 117 stored in the memory 110 to provide a service corresponding to a relevant application. The application driver 210 may be controlled by the application manager 220.

The application manager 220 executes the application management module 118 stored in the memory 110 to manage a relevant application. For example, the application manager 220 may control to determine an item sharable with a counterpart electronic device, and set sharable information for the determined item. Also, when receiving a user information transmission request from a counterpart electronic device, the application manager 220 may control not to transmit user information.

The display controller 230 executes the user interface module 114 stored in the memory 110 and controls to display a user interface on the touchscreen 190 using graphics. The display controller 230 controls to display information of an application driven by the application driver 210 on the touchscreen 190.

Figure 3:
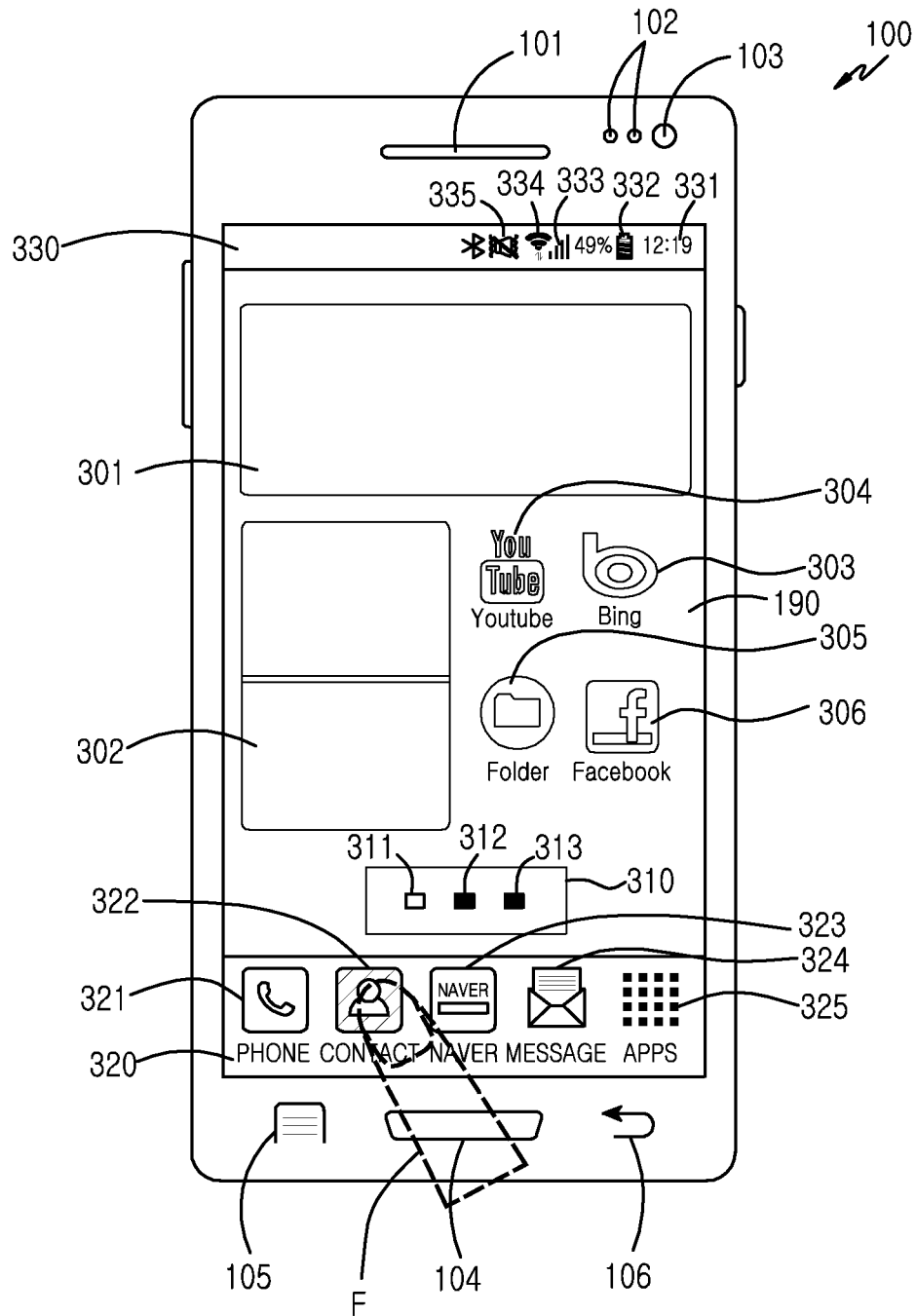
FIGS. 3 to 5 illustrate a process for setting sharable information via a contact information input screen of an electronic device according to an embodiment of the present invention.
Figure 4:
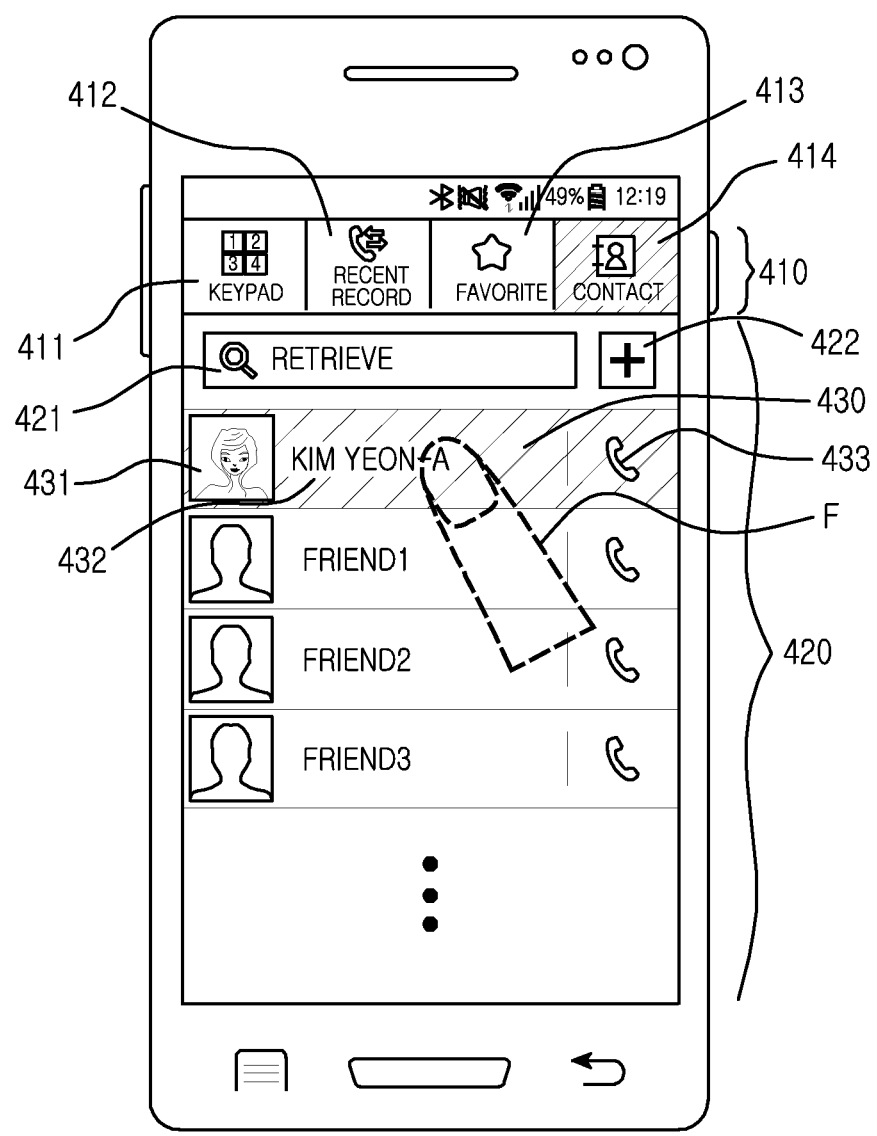
Figure 5:
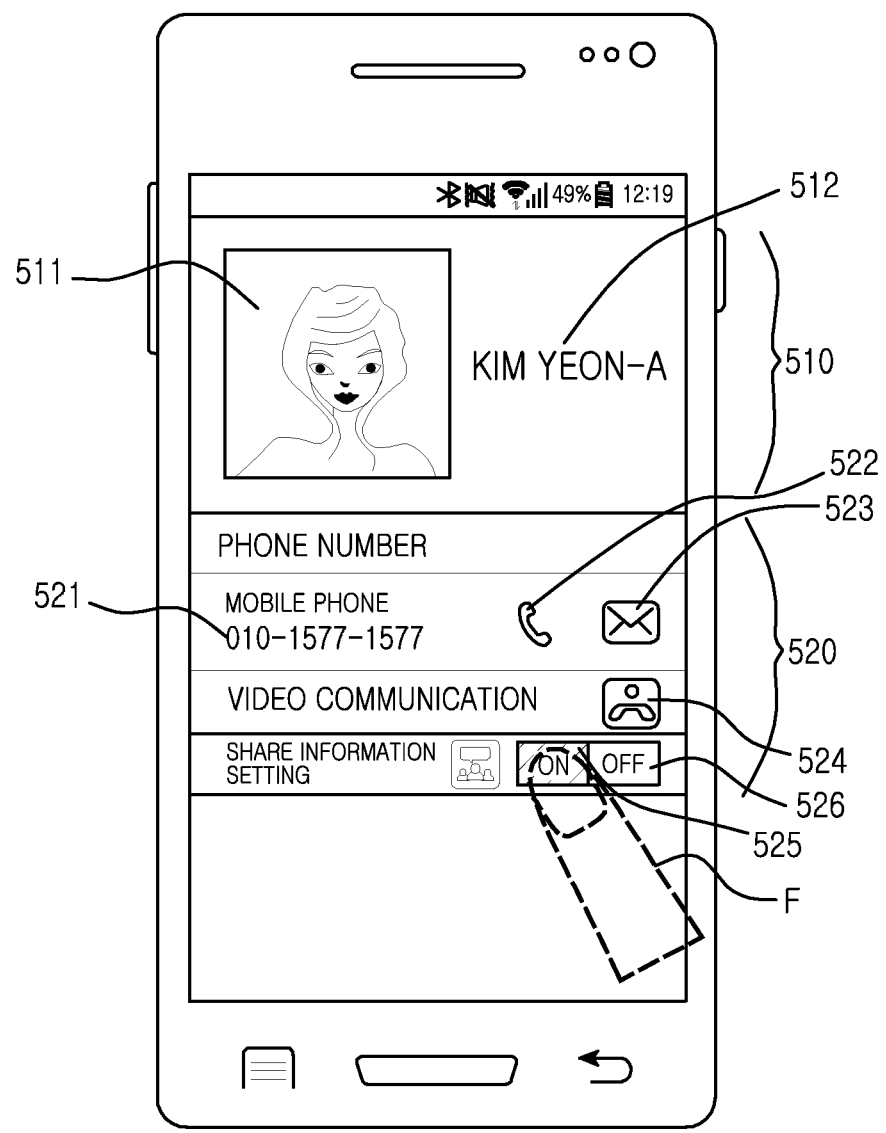

FIGS. 3 to 5 illustrate a process for setting sharable information via a contact information input screen of an electronic device according to an embodiment of the present invention.

Referring to FIG. 3, the touchscreen 190 is disposed on one side of the electronic device 100. A speaker unit 101, a plurality of sensors (for example, an illuminance sensor, a proximity sensor, etc.) 102, and a camera module 103 may be disposed on the upper portion of the touchscreen 190, and a physical button (referred to as a 'home' button) 104 may be disposed on the lower portion of the touchscreen 190. When the physical button 104 is pressed, it may perform a function for changing to a basic set screen either temporarily or permanently from a function currently executed by the electronic device 100. The physical button 104 may be used as a communication start button. Therefore, preferably, the physical button 104 may be a button easily manipulated by a user. This physical button 104 may be a key button where a metal dome installed to a substrate included inside the electronic device 100, for providing a sense of clicking to a user, has been installed.

A button 105 for a touch pad, for initiating a program or a function displayed on the touchscreen 190 may be disposed on one side of the physical button 104, and a button 106 for a touch pad, for executing cancellation of a program or a function displayed on the touchscreen 190 may be disposed on the other side of the physical button 104. However, it is not limited thereto, other known buttons may be applied as the button 105 for initiating and the button 106 for canceling. Though these buttons 104, 105, and 106 are provided to the outside of the touchscreen 190 in the present drawings, these buttons 104, 105, and 106 may be displayed together as a partial element of the touchscreen 190.

According to an embodiment of the present invention, the touchscreen 190 is configured as a basic screen displayed when the electronic device 100 enters a wakeup state. A plurality of objects 301, 302, 303, 304, 305, and 306 may be disposed at predetermined intervals or in a specific region of the touchscreen 190. The positions or the regions of these objects 301, 302, 303, 304, 305, and 306 may be changed by a user. These objects 301, 302, 303, 304, 305, and 306 may be displayed as widget icons 301, and 302 according to user setting, and icons 303, 304, 305, and 306 displaying programs. These objects 301, 302, 303, 304, 305, and 306 may further include a shortcut icon that may be performed by the user.

According to an embodiment of the present invention, the plurality of objects 301, 302, 303, 304, 305, and 306 included in the electronic device 100 of exceeds the number of icons currently shown on the screen of the touchscreen 190 generally. Therefore, the currently displayed screen may be only one of a plurality of pages, and the plurality of pages may be by a specific touch operation. The currently shown screen may be changed to the next page or the previous page by a specific touch operation such as a swipe touch or a panning touch in a predetermined direction, with respect to the current page region. Also, an indicator 310 may be disposed on a predetermined region of the screen so that the user may be made aware of the existence of additional pages. For example, the indicator 310 may include three indicators 311, 312, and 313 for indicating that there are three pages, and therefore the user may know the that contents of the screen spans three pages, and the current page is the first page.

According to an embodiment of the present invention, the lower region of the illustrated touchscreen 190 is a fixed menu region 320 and may accommodate objects 321, 322, 323, 324, and 325 for basic functions of the electronic device 100. A dialing icon 321, contact information icon 322, a message transmission/reception icon 324, an application select icon 325, etc. may be disposed in the fixed menu region 320, and e.g. a frequently used Internet entry icon 323, etc. may be additionally disposed by the user's setting.

According to an embodiment of the present invention, a status bar 330, for providing various status information of the electronic device to the user, may be displayed on the upper region of the touchscreen 190. The status bar 330 may include a time 331, a battery status indicator 332, signal strength indicators 333, 334 for wireless communication, an output notice information indicator 335 of the electronic device 100, etc.

FIG. 4 illustrates a screen configuration in the case where the contact information icon 322 has been executed on the screen of FIG. 3.

Referring to FIG. 4, the touchscreen 190 may be a contact information list screen 420 where a counterpart user's contact information is stored.

According to an embodiment of the present invention, a fixed menu region 410 is disposed on the upper portion of the contact information list screen 420 of the touchscreen 190. A keypad icon 411, a recent record icon 412, a favorite icon 413, a contact information icon 414, etc. may be disposed in the fixed menu region 410. The fixed menu region 410 performs a role of the indicator 310, and icons 411, 412, 413, and 414 included in the fixed menu region 410 may perform a role of the above-described indicators 311, 312, and 313.

Since the four icons 411, 412, 413, and 414 are illustrated in the fixed menu region 410, the fixed menu region 410 may consist of four pages. The current page may be changed to the favorite icon page 413 which is the previous page by a swipe touch, and a panning touch in a predetermined direction with respect to the current page region. The contact information icon 414 is highlighted in a size different from the rest of the three icons 411, 412, and 413, so that the electronic device may inform the user that the current page displayed on the touchscreen 190 is a page for the contact information icon 414. In the case where the view in the touchscreen 190 changes from the current page to a page of the favorite icon 413 by an operation of touching the favorite icon 413 and displays the page of the favorite icon 413, the favorite icon 413 of the fixed menu region 410 may be highlighted and displayed in a larger size compared to that of the other icons 411, 412, and 414.

According to an embodiment of the present invention, objects 421, 422, and 430 for retrieving, storing, and editing, respectively, contact information is disposed on the contact information list screen 420. A contact information retrieve screen 421 for retrieving contact information is disposed on the upper portion of the contact information list screen 420. A keyword for retrieving contact information may be input to the contact information retrieve screen 421. The keyword may include all or a portion of at least one of a phone number, initial consonant, an e-mail address, and an initial. A contact information addition icon 422 for storing contact information is disposed on one side of the contact information retrieve screen 421.

According to an embodiment of the present invention, a plurality of contact information lists may be sequentially arranged in the lower portion of the contact information retrieve screen 421. A photo 431, a name 432 of a counterpart user, and a call icon 433 for communication with the counterpart user may be disposed on the contact information list 430. However, it is not limited thereto, a phone number, an e-mail address, a nickname, etc. may be further disposed on the contact information list 430.

FIG. 5 illustrates screen configuration in the case where a user touches the contact information list 430 on the screen of FIG. 4.

Referring to FIG. 5, the touchscreen 190 may be a contact information edit screen for editing stored contact information.

According to an embodiment of the present invention, a basic information display window 510 where a photo 511 and a name of a counterpart user corresponding to relevant contact information is disposed on the upper portion of the touchscreen 190. However, it is not limited thereto, and a phone number, an e-mail address, a nickname, a birthday, etc. of the counterpart user may be further displayed on the basic information display window 510.

According to an embodiment of the present invention, a detailed information display window 520 is further disposed in the lower portion of the basic information display window 510. A plurality of objects 521, 522, 523, 524, 525, and 526 may be disposed at a predetermined interval or in a specific region of the detailed information display window 520. The positions or the regions of these objects 521, 522, 523, 524, 525, and 526 may be changed by a user. These objects 521, 522, 523, 524, 525, and 526 may be displayed as a phone number 521 of a counterpart user corresponding to relevant contact information, a call icon 522 for communication with the counterpart user, an icon 524 for video communication with the counterpart user, and on/off icons 525, 526 for setting sharable information in an SNS application. According to an embodiment, as the on/off icons 525, 526 for setting sharable information are selected, the electronic device 100 may share user information or block user information sharing in the SNS application.

Figure 6A:
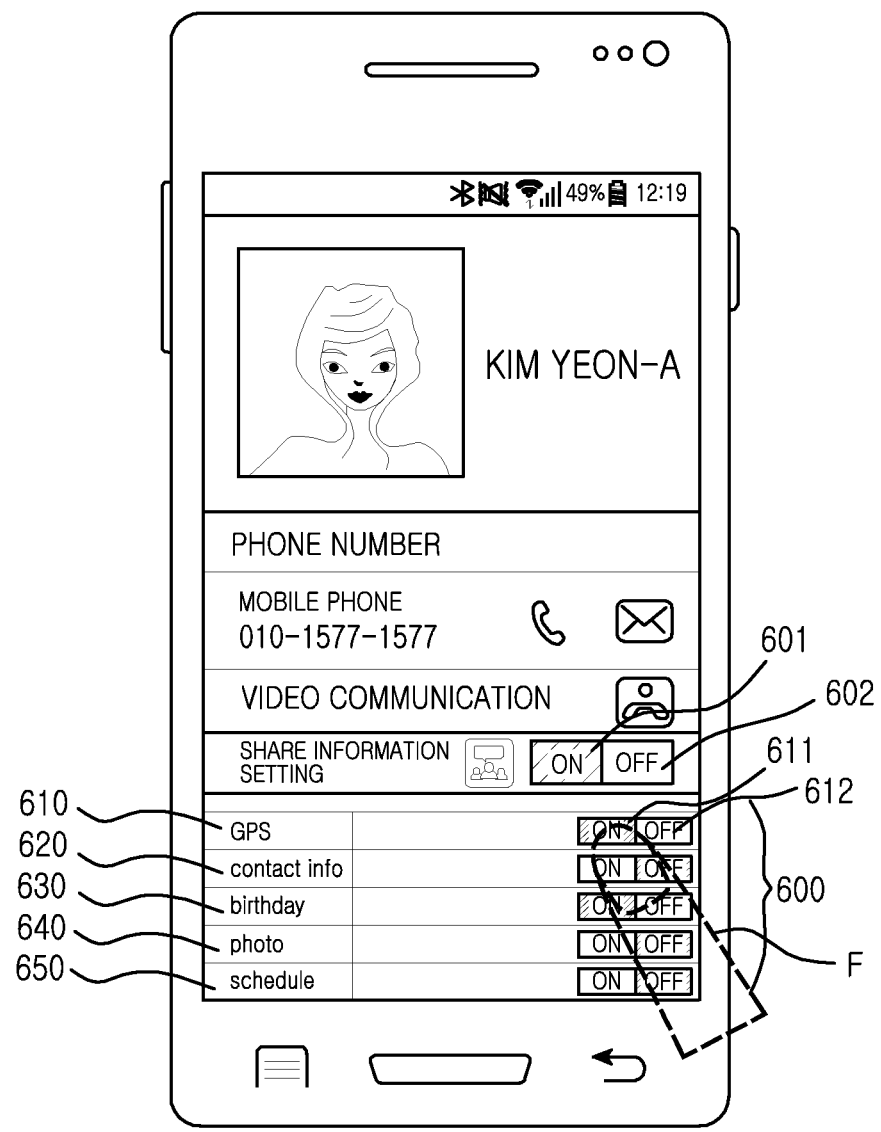
FIGS. 6A and 6B are views of screen configurations illustrating sharable information on an electronic device according to an embodiment of the present invention.
Figure 6B:
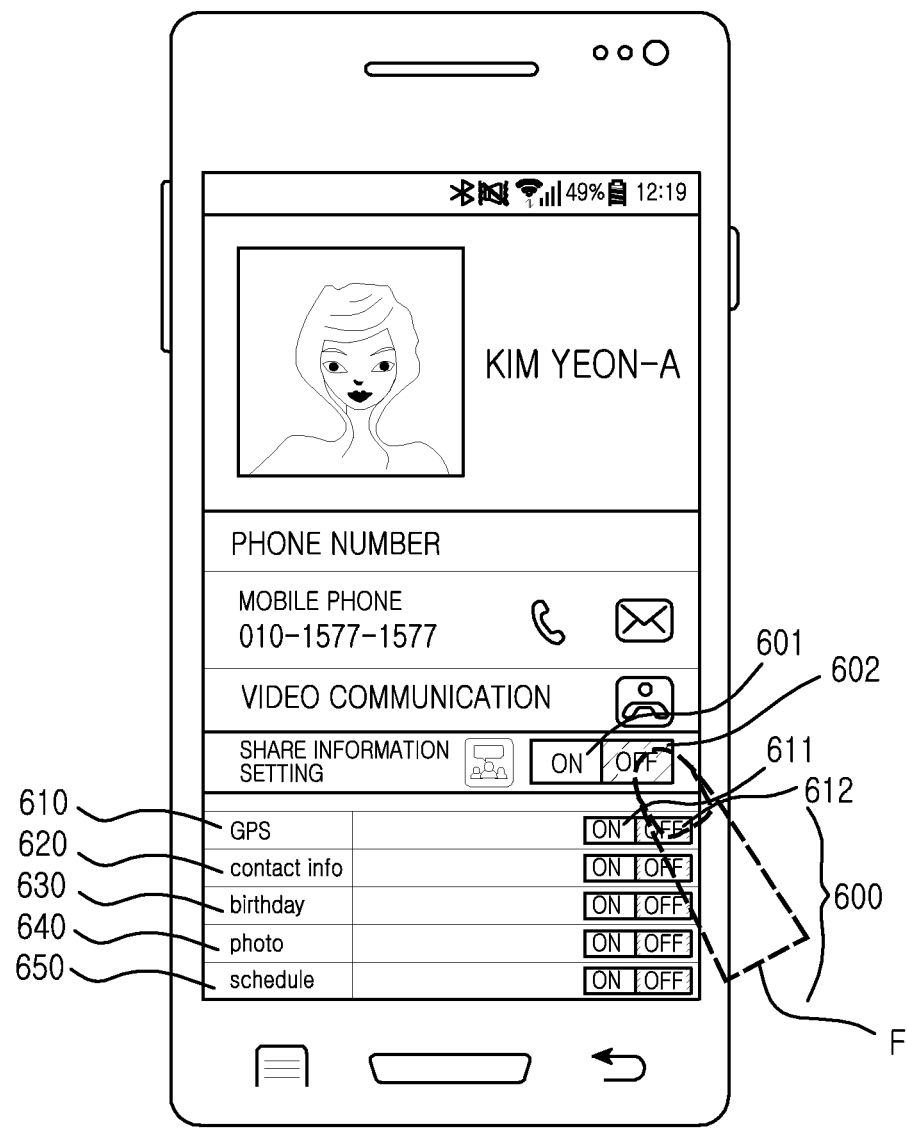

FIGS. 6A and 6B are views of screen configurations illustrating setting sharable information on an electronic device according to an embodiment of the present invention.

FIG. 6A illustrates screen configuration in the case of selecting an on icon 525 for setting sharable information on the screen of FIG. 5. Referring to FIG. 6A, an on icon 601 for setting sharable information is highlighted and displayed in a size different from an off icon 602. Also, a detailed item window 600 for share information setting is disposed on the lower portion of the touchscreen 190. A plurality of items 610, 620, 630, 640, and 650 or arranged in the detailed item window 600. The plurality of items 610, 620, 630, 640, and 650 may be a position information item 610, a contact information item 620, a birthday information item 630, a photo information item 640, and a schedule information item 650. However, they are not limited thereto and various user information items may be further included in the detailed item window 600. The plurality of items 610, 620, 630, 640, and 650 may include on/off icons 611, 612, etc. for setting share information corresponding to each item.

According to an embodiment of the present invention, the electronic device 100 controls setting a sharable information for each item via the on/off icons 611, 612. According to the present drawing, since on icons 611 of the position information item 610 and the birthday information item 630 are selected, information for the position information item 610 and the birthday information item 630 enter a shared state in the electronic device 100. At this point, the selected icons 611, etc. may be highlighted and displayed in a size different from the off icons 612, etc. The electronic device 100 may store user information reflecting a sharable information setting using a pressable button or a backspace button.

FIG. 6B illustrates a screen configuration in the case of selecting the off icon 526 for sharable information setting on the screen of FIG. 5. Also, FIG. 6B includes a case where the off icon 602 for sharable information is selected on the screen of FIG. 6A.

Referring to FIG. 6B, the off icon 602 for setting sharable information is highlighted and displayed in a size different from the on icon 601. Also, a detailed item window 600 for sharable information setting is disposed on the lower portion of the touchscreen 190. The plurality of items 610, 620, 630, 640, and 650 is arranged on the detailed item window 600. The plurality of items 610, 620, 630, 640, 650 may be the position information item 610, the contact information item 620, the birthday information item 630, the photo information item 640, and the schedule information item 650. However, they are not limited thereto and various user information items may be further included in the detailed item window 600. The plurality of items 610, 620, 630, 640, and 650 may include on/off icons 611 and 612 for setting sharable information corresponding to each item.

According to an embodiment of the present invention, the electronic device 100 controls setting sharable information for each item via the on/off icons 611 and 612. However, as described above, in the case where the off icon 602 for setting sharable information is selected, the electronic device 100 deactivates all of sharable information setting for the respective items 610, 620, 630, 640, and 650. The off icon 612, for example, of the items 610, 620, 630, 640, and 650 included in the detailed item window 600 may be highlighted and displayed in a size different from those of the on icons 611.

Figure 7A:
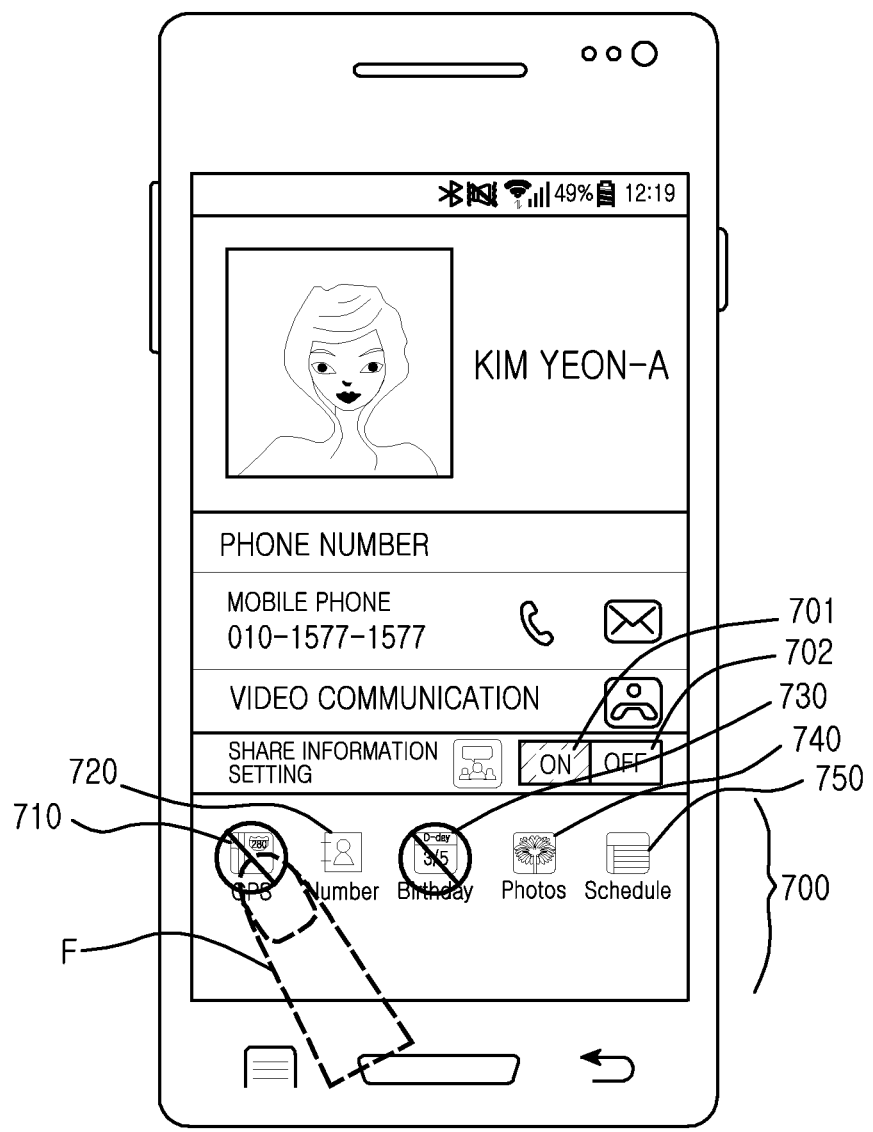
FIGS. 7A and 7B are views of screen configurations illustrating setting sharable information on an electronic device according to another embodiment of the present invention.
Figure 7B:
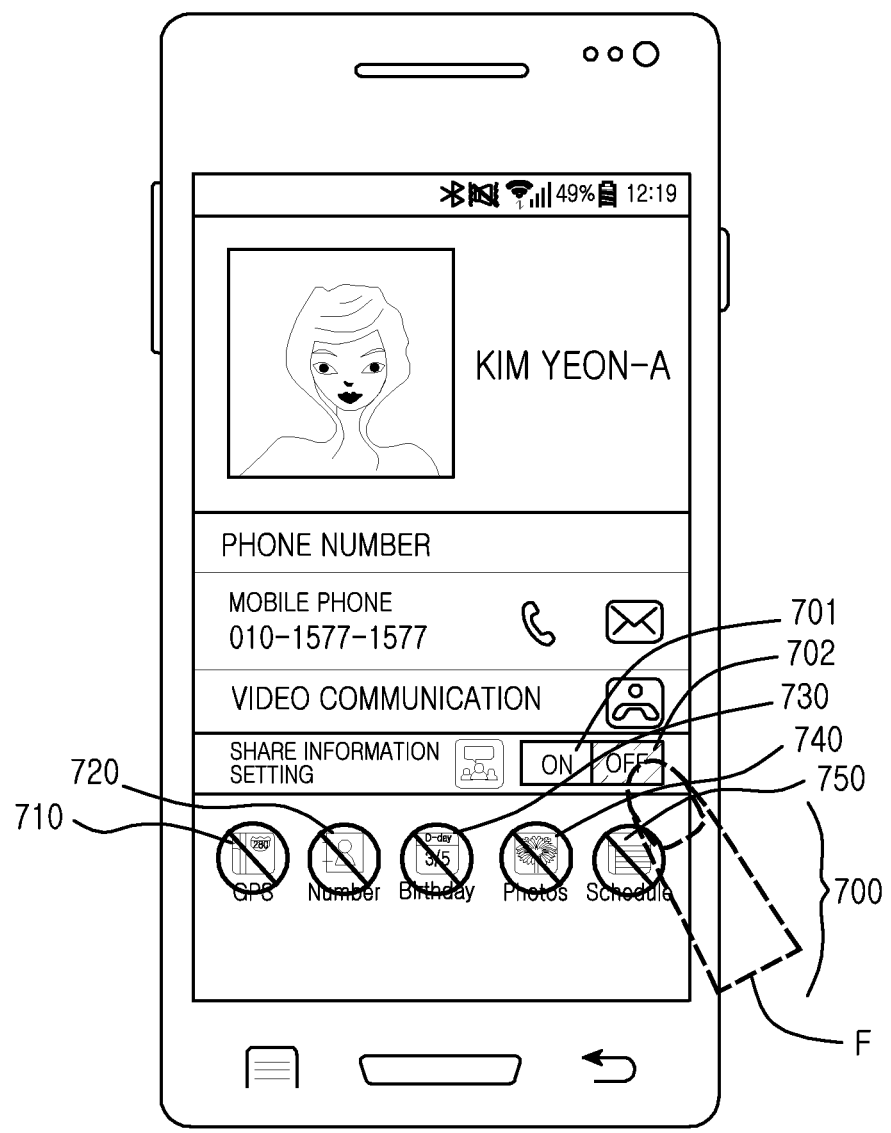

FIGS. 7A and 7B are views of screen configurations sharable information on an electronic device according to an embodiment of the present invention.

FIG. 7A illustrates screen configuration in the case of selecting the on icon 525 for setting sharable information on the screen of FIG. 5. Referring to FIG. 7A, an on icon 701, for setting sharable information, is highlighted and displayed in a size different from that of an off icon 702. Also, a detailed item window 700, for setting sharable information is disposed on the lower portion of the touchscreen 190. A plurality of items 710, 720, 730, 740, and 750 is arranged on the detailed item window 700. The plurality of items 710, 720, 730, 740, and 750 may be a position information setting icon 710, a contact information setting icon 720, a birthday information setting icon 730, a photo information setting icon 740, and a schedule information setting icon 750. However, they are not limited thereto and various user information icons may be further included in the detailed item window 700. The plurality of icons 710, 720, 730, 740, and 750 selected for setting sharable of information corresponding to each icon.

According to an embodiment of the present invention, the electronic device 100 displays selection of the plurality of icons 710, 720, 730, 740, and 750 using a specific symbol. This specific symbol may be a prohibited symbol. For example, when the position information setting icon 710 is selected once, the electronic device 100 displays a prohibited symbol on the position information setting icon 710, and when the position information setting icon 710 is selected twice, the electronic device 100 deletes the prohibited symbol from the position information setting icon 710. According to the present drawing, since the position information setting icon 710 and the birthday information setting icon 730 are selected, information for the position information setting icon 710 and the birthday information setting icon 730 enters a shared state in the electronic device 100.

FIG. 7B illustrates a screen configuration in the case of selecting the off icon 526 for sharable information setting on the screen of FIG. 5. Also, FIG. 7B includes a case where the off icon 702 for setting sharable information has been selected on the screen of FIG. 7A.

Referring to FIG. 7B, the off icon 702 for setting sharable information is highlighted and displayed in a size different from that of the on icon 701. Also, the detailed item window 700 for setting sharable information is disposed on the lower portion of the touchscreen 190. The plurality of items 710, 720, 730, 740, and 750 is arranged on the detailed item window 700. The plurality of items 710, 720, 730, 740, and 750 may be the position information setting icon 710, the contact information setting icon 720, the birthday information setting icon 730, the photo information setting icon 740, and the schedule information setting icon 750. However, they are not limited thereto and various other user information icons may be further included in the detailed item window 700. The plurality of icons 710, 720, 730, 740, and 750 is selected for setting sharable information corresponding to each icon.

According to an embodiment of the present invention, the electronic device 100 displays selection of the plurality of icons 710, 720, 730, 740, and 750 using a specific symbol. This specific symbol may be a prohibit symbol. However, as described above, when the off icon 702 for setting sharable information is selected, the electronic device 100 deactivates all of the sharable information settings for the respective icons 710, 720, 730, 740, and 750. A specific symbol may be displayed on the icons 710, 720, 730, 740, and 750 included in the detailed item window 700.

Figure 8:
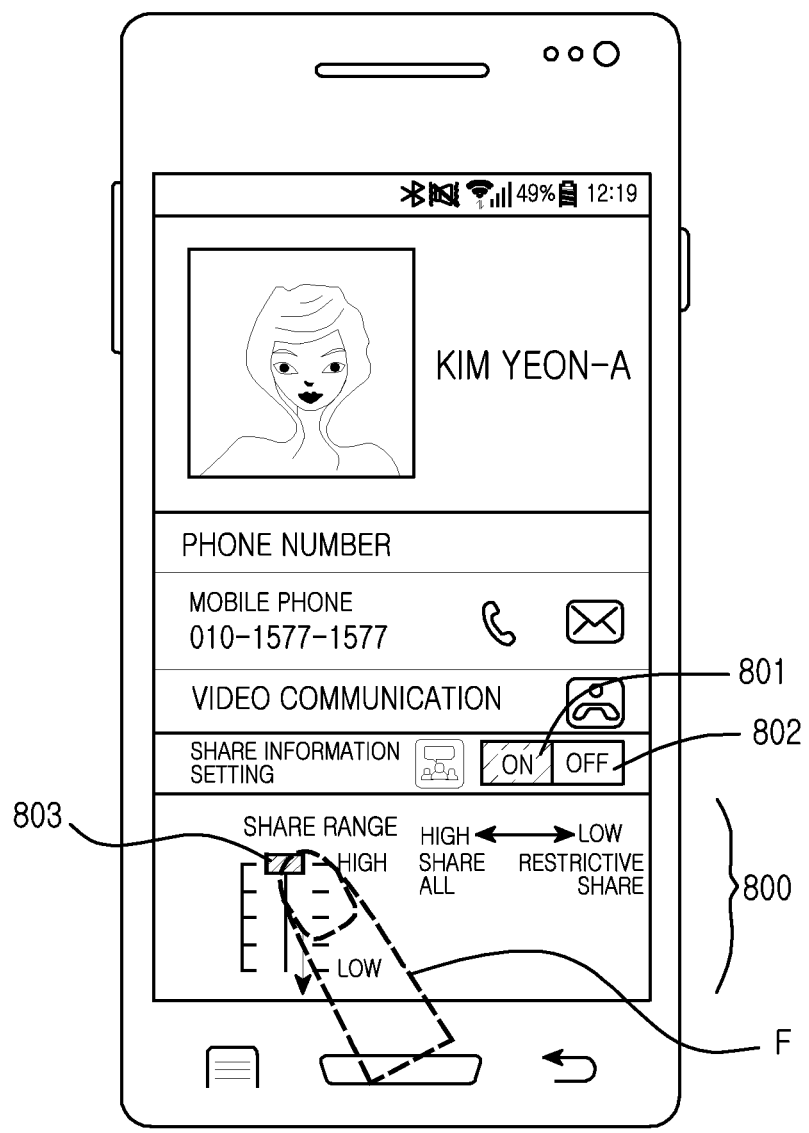
FIG. 8 is a view of a screen configuration illustrating setting sharable information on an electronic device according to yet another embodiment of the present invention.

FIG. 8 is a view of a screen configuration illustrating setting sharable information on of an electronic device according to an embodiment of the present invention.

FIG. 8 illustrates a screen configuration in the case of selecting the on icon 525 for setting sharable information on the screen of FIG. 5. Referring to FIG. 8, an on icon 801 for setting sharable information is highlighted and displayed in a size different from that of an off icon 802. Also, a sharable range display window 800 for setting the range of sharable information is disposed on the lower portion of the touchscreen 190.

According to an embodiment of the present invention, an indicator 803 for manipulating the range sharable information is disposed on the sharable range display window 800. A user may drag this indicator 803 in an up or down direction to set a corresponding share information range. For example, the electronic device 100 may determine a sharable class such as 'high' or 'low'. In case of a 'high' class, the electronic device 100 publicizes all information of a user. In case of a 'low' class, the electronic device 100 shares user information restrictively. However, the sharable class is not limited thereto but a plurality of classes may be further added between the 'high' and the 'low'. The sharable information range band on a class may be set by a user and implemented in various ways.

Figure 9:
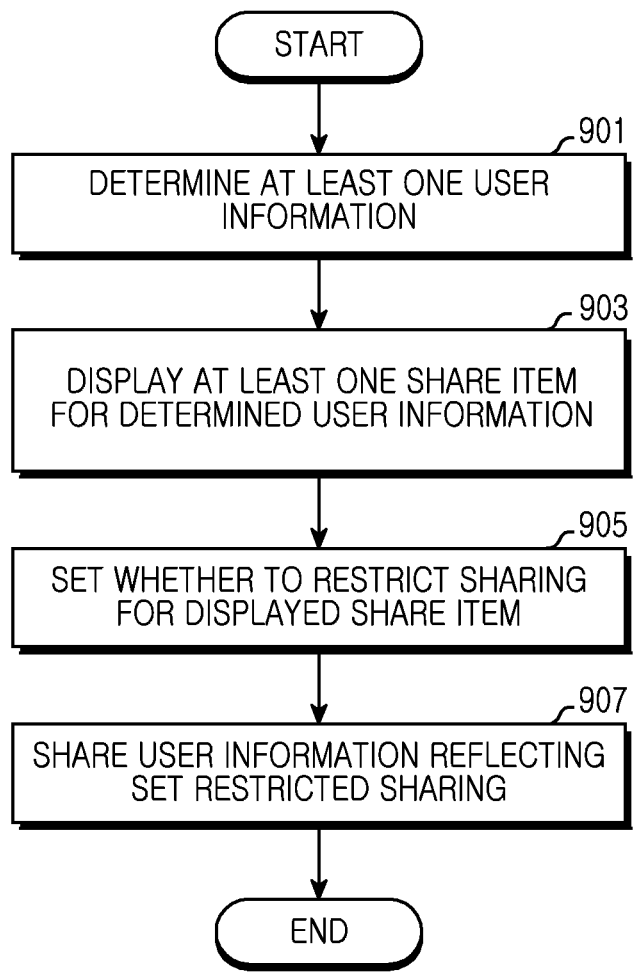
FIG. 9 is a flowchart illustrating a method for operating an electronic device according to an embodiment of the present invention.

FIG. 9 is a flowchart illustrating a method for operating an electronic device according to an embodiment of the present invention.

Referring to FIG. 9, the electronic device 100 determines at least one user information in step 901. According to an embodiment of the present invention, the user information may be contact information.

The electronic device 100 may display at least one sharable item regarding the determined user information in step 903. According to an embodiment, the share item may be displayed as text or an image object.

The electronic device 100 may then determine whether to restrict sharing of the displayed share item in step 905.

The electronic device 100 shares the user information reflecting set sharing restriction in step 907. According to an embodiment, the electronic device 100 shares the user information with a counterpart electronic device via a user-based application (for example, an SNS application, etc.). The user information includes at least one of position information, contact information, birthday information, photo information, and schedule information.

An instruction set for each operation is stored as one or more modules in the above-mentioned memory 110. In this case, a module stored in the memory 110 is executed by one or more processors 122.

Figure 10:
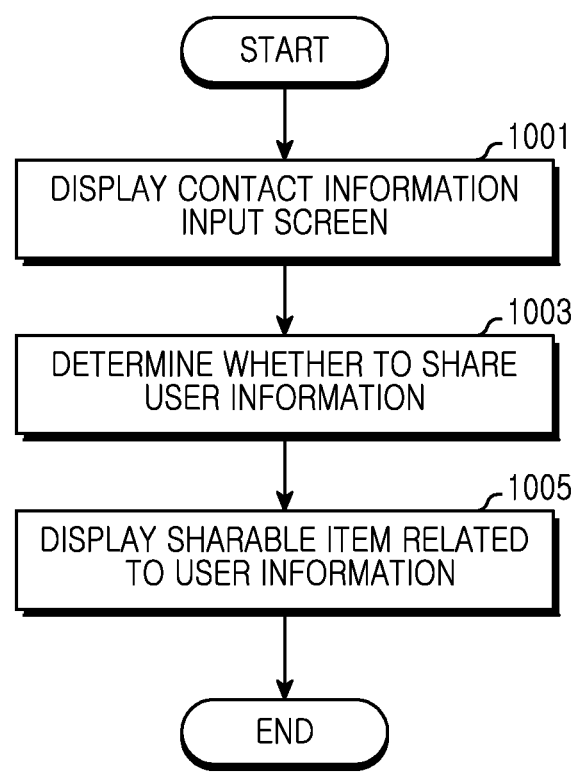
FIG. 10 is a flowchart illustrating a method for operating an electronic device according to another embodiment of the present invention.

FIG. 10 is a flowchart illustrating a method for operating an electronic device according to another embodiment of the present invention.

Referring to FIG. 10, the electronic device 100 displays a contact information input screen in step 1001. According to an embodiment, the contact information input screen may be configured as in FIG. 5, and the contact information input screen may be a contact information edit screen for editing contact information input in advance.

Next, the electronic device 100 determines whether to share user information in step 1003. According to an embodiment of the present invention, the user information may include position information, contact information, birthday information, photo information, schedule information, etc. of a user. However, the contact information is not limited thereto but may further include various other user information.

The electronic device 100 displays a sharable item related to the user information in step 1005. According to an embodiment, the electronic device 100 displays a sharable item in the form of text or an icon on the contact information input screen.

An instruction set for each operation is stored as one or more modules in the above-mentioned memory 110. In this case, a module stored in the memory 110 is executed by one or more processors 122.

Figure 11:
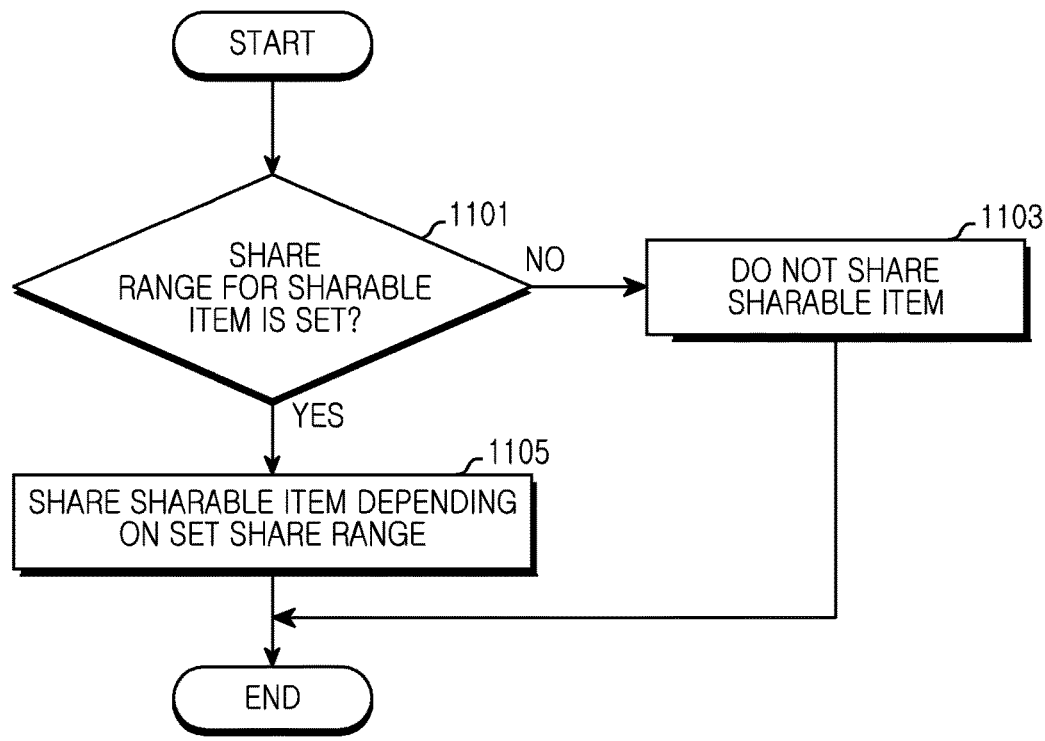
FIG. 11 is a flowchart illustrating a method for operating an electronic device according to another embodiment of the present invention.

FIG. 11 is a flowchart illustrating a method for operating an electronic device according to an embodiment of the present invention.

Referring to FIG. 11, the electronic device 100 determines whether a sharable range for a sharable item is set in step 1101. According to an embodiment of the present invention, the sharable item includes at least one user information that may be shared with a counterpart electronic device, that is, position information, contact information, birthday information, photo information, schedule information, etc. of a user. However, the user information is not limited thereto but may further include various other user information.

In the case where a sharable range is not set, the electronic device 100 does not share the sharable item in step 1103. According to an embodiment of the present invention, the electronic device 100 may block all of items that may be shared with a counterpart electronic device via a user-based application (for example, an SNS application).

In the case where the sharable range is set, the electronic device 100 shares the sharable item depending on the set share range in step 1105. According to an embodiment of the present invention, the electronic device 100 shares a determined item that may be shared with a counterpart electronic device via a user-based application (for example, an SNS application).

An instruction set for each operation is stored as one or more modules in the above-mentioned memory 110. In this case, a module stored in the memory 110 may be executed by one or more processors 122.

According to an embodiment of the present invention, the share range may include friendliness. Where friendliness may be determined by the number of communication transmissions/receptions between the user and a counterpart electronic device, the number of message transmissions/receptions, or status information of a user-based application.

Figure 12:
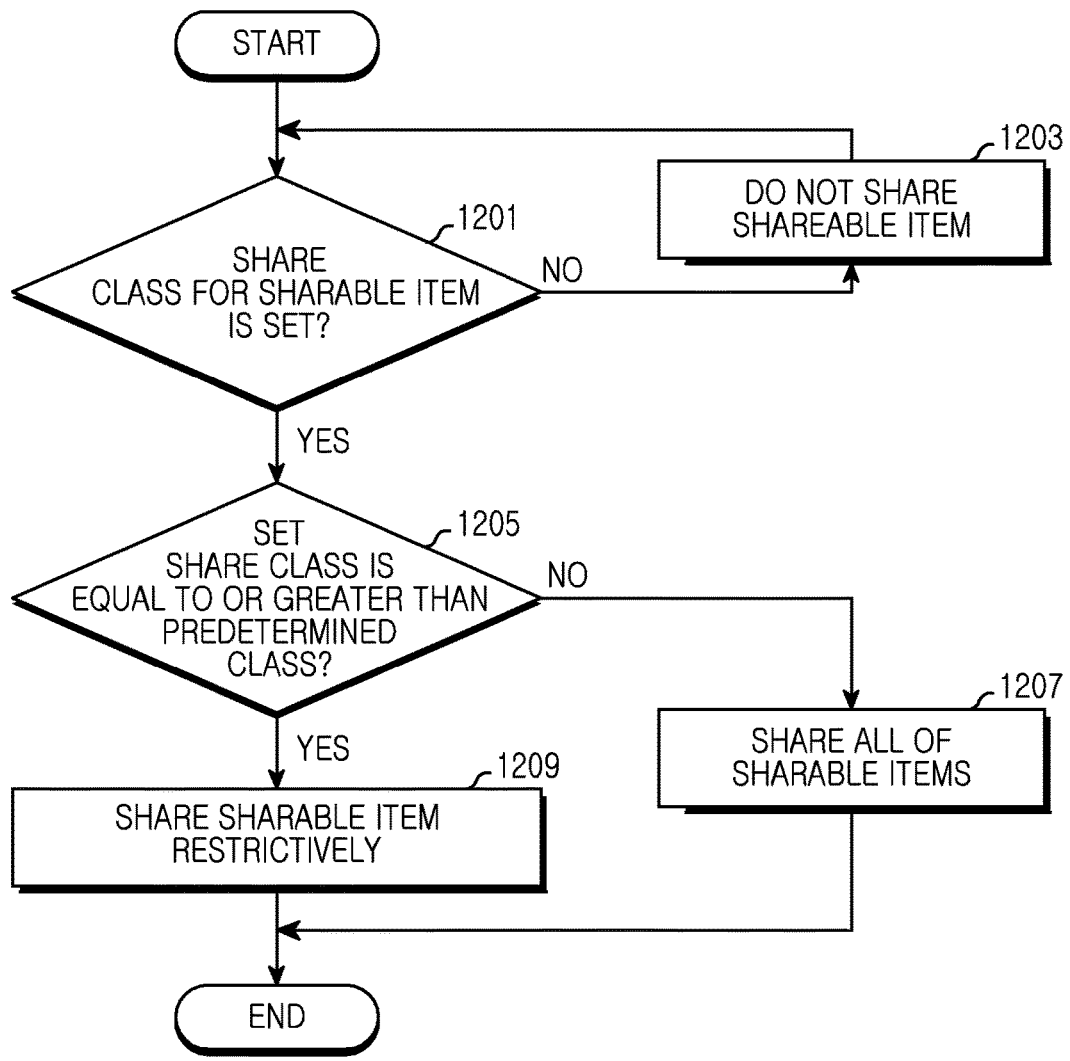
FIG. 12 is a flowchart illustrating a method for operating an electronic device according to another embodiment of the present invention.

FIG. 12 is a flowchart illustrating a method for operating an electronic device according to an embodiment of the present invention.

Referring to FIG. 12, the electronic device 100 determines whether sharable class for a sharable item is set in step 1201. According to an embodiment of the present invention, the sharable item includes at least one user information that may be shared with a counterpart electronic device, that is, position information, contact information, birthday information, photo information, schedule information, etc. of a user. However, the user information is not limited thereto but may further include various other user information. Also, a sharable item is determined based on a set class, and the sharable item may be changed based on a set class by a user's setting.

In the case where a sharable class is not set, the electronic device 100 does not share a sharable item in step 1203. According to an embodiment, the electronic device 100 may block all of items that may be shared with a counterpart electronic device via a user-based application (for example, an SNS application).

In the case where the sharable class is set, the electronic device 100 may determines whether a set sharable class is equal to or greater than a predetermined class in step 1205.

In the case where the set sharable class is less than the predetermined class, the electronic device 100 shares all of sharable items in step 1207. According to an embodiment of the present invention, the electronic device 100 shares all of sharable items via a counterpart electronic device and a user-based application (for example, an SNS application).

In the case where the set sharable class is equal to or greater than the predetermined class, the electronic device 100 shares a sharable item restrictively in step 1209. According to an embodiment of the present invention, the electronic device 100 determines a sharable item based on a set share class. The electronic device 100 shares a determined sharable item with a counterpart electronic device via a user-based application (for example, an SNS application).

An instruction set for each operation is stored as one or more modules in the above-mentioned memory 110. In this case, a module stored in the memory 110 is executed by one or more processors 122.

Figure 13:
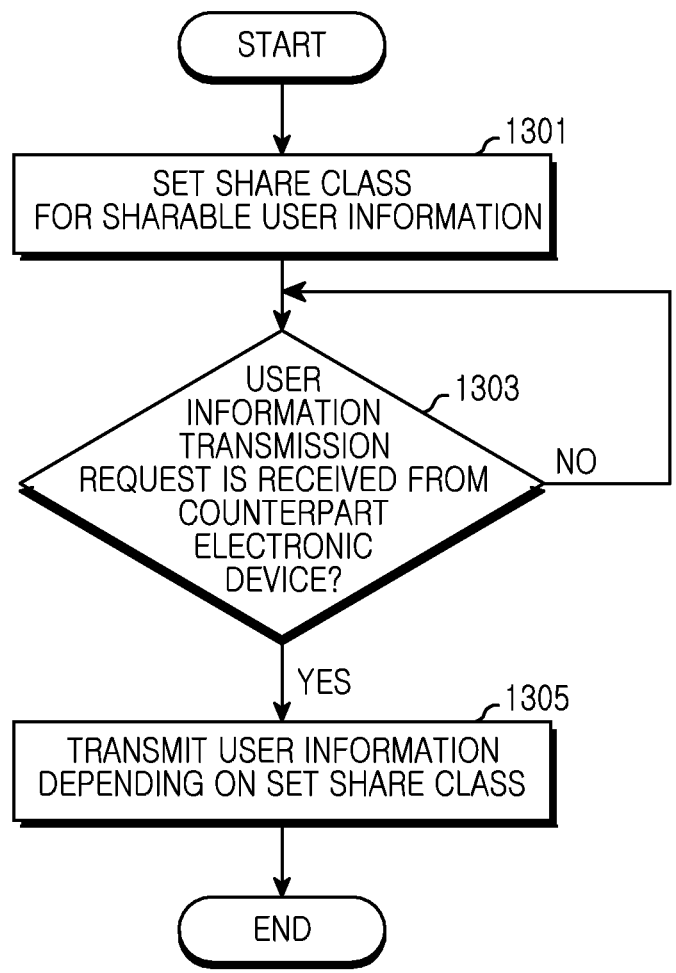
FIG. 13 is a flowchart illustrating a method for operating an electronic device according to another embodiment of the present invention.

FIG. 13 is a flowchart illustrating a method for operating an electronic device according to an embodiment of the present invention.

Referring to FIG. 13, the electronic device 100 sets a sharable class for sharable user information in step 1301. According to an embodiment of the present invention, the sharable user information may include at least one user information that may be shared with a counterpart electronic device, that is, position information, contact information, birthday information, photo information, schedule information, etc. of a user. However, the user information is not limited thereto but may further include various other user information. Also, sharable user information is determined depending on a set class, and the sharable user information is changed depending on a set class by a user's setting.

Next, the electronic device 100 determines whether a user information share request has been received from a counterpart electronic device in step 1303. According to an embodiment of the present invention, the counterpart electronic device makes a user information transmission request to the electronic device 100 via a user-based application (for example, an SNS application).

In case of receiving a user information transmission request, the electronic device 100 transmits user information depending on a set sharable class in step 1305.

An instruction set for each operation is stored as one or more modules in the above-mentioned memory 110. In this case, a module stored in the memory 110 is executed by one or more processors 122.

According to various embodiments of the present invention, each of modules may be configured in software, firmware, hardware, or a combination thereof. Also, all or a portion of a module may be configured in one entity and may perform the function of each module. According to various embodiments of the present invention, respective operations may be executed sequentially, repetitively, or in parallel. Also, some operations may be omitted or other operations may be added and executed. For example, respective operations may be executed by a corresponding module described by the present invention.

Also, methods according to embodiments of the present invention described in claims and/or the specification of the present invention may be implemented in the form of hardware, a software, or a combination of hardware and a software.

In case of implementation in the form of a software, a computer readable storage medium for storing one ore more programs (software modules) is provided. One or more programs stored in the computer readable storage medium are configured for execution by one or more processors inside the electronic device. One or more programs includes instructions for enabling the electronic device to execute the methods according to the embodiments described in claims and/or the specification of the present invention.

This software program may be stored in Random Access Memory (RAM), a non-volatile memory including a flash memory, Read Only Memory (ROM), an Electrically Erasable Programmable Read Only Memory (EEPROM), a magnetic disc storage device, a Compact Disc (CD)-ROM, Digital Versatile Discs (DVDs), or other types of optical storage devices, and a magnetic cassette. Alternatively, the program may be stored in a memory configured by a portion or all of these. Also, a plurality of respective element memories may be provided.

Also, the program is stored in an attachable storage accessible to the electronic device via a communication network such as the Internet, an Intranet, a Local Area Network (LAN), Wide LAN (WLAN), or SAN, or a communication network configured in a combination of these. The storage may access the electronic device via an external port.

Also, a separate storage on a communication network may access a portable electronic device.

Although the invention has been shown and described with reference to certain embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method for sharing user information in an electronic device, the method comprising the steps of:
    determining a user to share the user information among a plurality of users included in a contact list;
    displaying a plurality of sharable items for the determined user with indications, basic information of the determined user, and a menu on a screen for editing a contact information of the determined user, wherein each of the indications represent whether to share each of the plurality of sharable items; and determining at least one item to be shared among the plurality of sharable items based on a user input on the each of the indications, wherein an icon related to the sharable items set to restrict sharing is displayed with a prohibition symbol, whether to share the user information is set for each of the plurality of users, the basic information comprises at least one of a photo information, a phone number, an email address, and a birthday information of the determined user, and the menu on a screen comprises at least one of a first menu for connecting a call with the determined user and a second menu for sending a message to the determined user.

2. The method of claim 1, wherein the user information is the contact information.

3. The method of claim 1, wherein the plurality of sharable items are included in the user information.

4. The method of claim 1, wherein at least one of the plurality of sharable items is a user-based application capable of sharing the user information.

5. The method of claim 1, wherein the user information and the plurality of sharable items are displayed on a same screen.

6. The method of claim 1, wherein the plurality of sharable items are displayed as at least one of text and an image object.

7. The method of claim 1, wherein the plurality of sharable items are determined and displayed as a sharable class.

8. The method of claim 7, further comprising determining a degree of sharing restriction of the user information based on the sharable class.

9. The method of claim 7, wherein the displayed item is shared based on the sharable class.

10. The method of claim 1, further comprising:
storing the user information reflecting whether the user information is shared.

11. The method of claim 1, wherein the plurality of sharable items are displayed on a contact information input screen or a contact information edit screen.

12. The method of claim 1, wherein the user information comprises at least one of position information, the contact information, the birthday information, the photo information, and schedule information.

13. An electronic device comprising:
a touchscreen; and
at least one processor coupled with the touchscreen,
wherein the processor is configured to determine a user to share a user information among a plurality of users included in a contact list, display a plurality of sharable items for the determined user with indications, basic information of the determined user, and a menu on a screen for editing a contact information of the determined user, wherein each of the indications represent whether to share each of the plurality of sharable items and determine at least one item to be shared among the plurality of sharable items based on a user input on each of the indications, wherein an icon related to the sharable item set to restrict sharing is displayed with a prohibition symbol, whether to share the user information is set for each of the plurality of users, the basic information comprises at least one of a photo information, a phone number, an email address, and a birthday information of the determined user, and the menu comprises at least one of a first menu for connecting a call with the determined user, and a second menu for sending a message to the determined user.

14. The electronic device of claim 13, wherein the processor is further configured to display the user information and the plurality of sharable items on a same screen.

15. The electronic device of claim 13, wherein the processor is further configured to display the plurality of sharable items as at least one of text and an image object.

16. The electronic device of claim 13, wherein the processor is further configured to determine and display the plurality of sharable items as a sharable class.

17. The electronic device of claim 16, wherein the processor is further configured to determine a degree of sharing restriction of the user information based on the sharable class.

18. The electronic device of claim 16, wherein the processor is further configured to restrictively share the displayed item depending on the sharable class.

19. The electronic device of claim 13, wherein the processor is further configured to display the plurality of sharable items on a contact information input screen or a contact information edit screen.

* * * * *